May 11, 1954 — F. SPRAGUE ET AL — 2,678,029
WINDSHIELD WIPER MOTOR
Filed Oct. 23, 1948 — 3 Sheets-Sheet 1

INVENTORS
FRANK SPRAGUE AND
ELTON F. NICHOLS.
BY Attach & Knoblock
ATTORNEYS

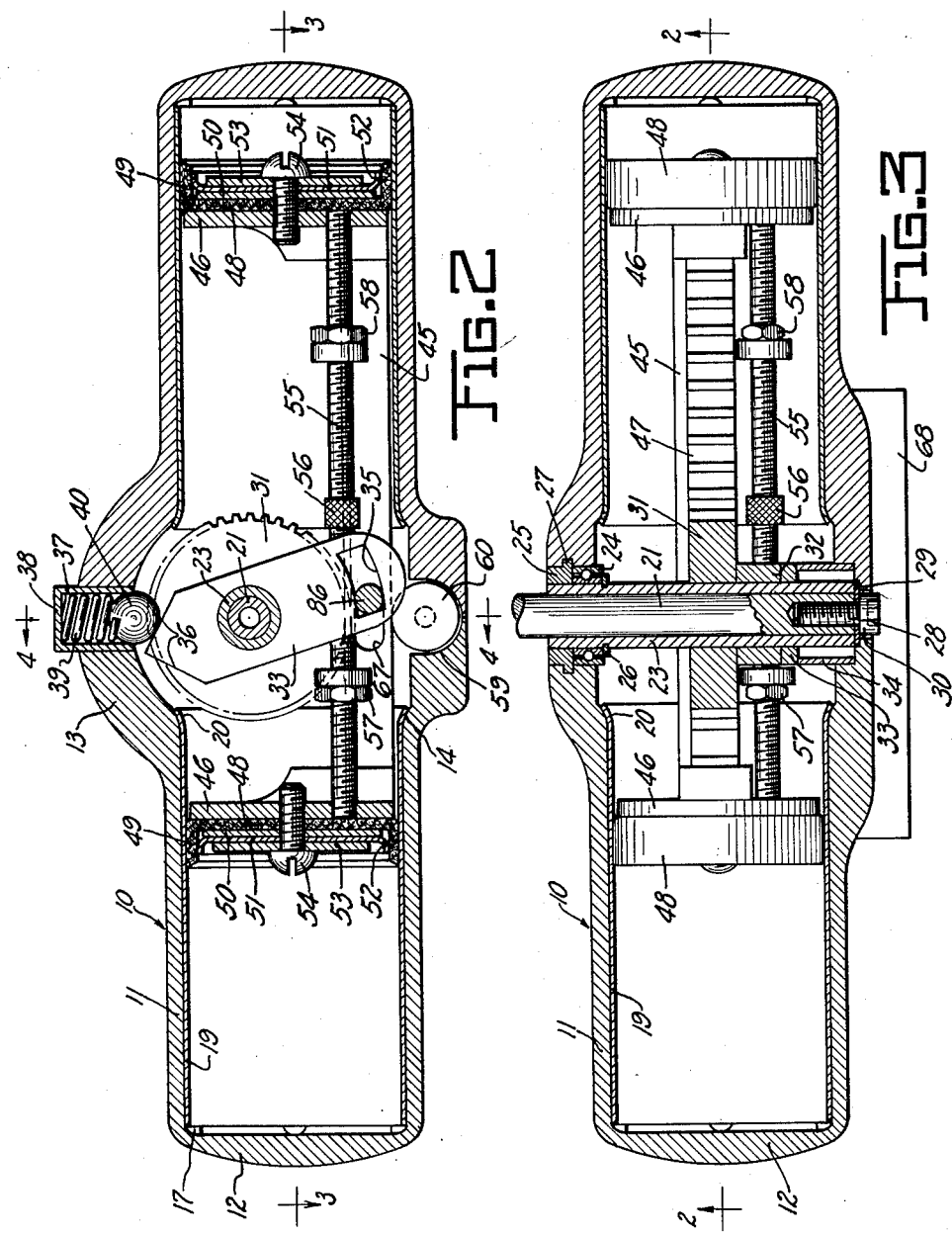

May 11, 1954  F. SPRAGUE ET AL  2,678,029
WINDSHIELD WIPER MOTOR
Filed Oct. 23, 1948  3 Sheets-Sheet 3
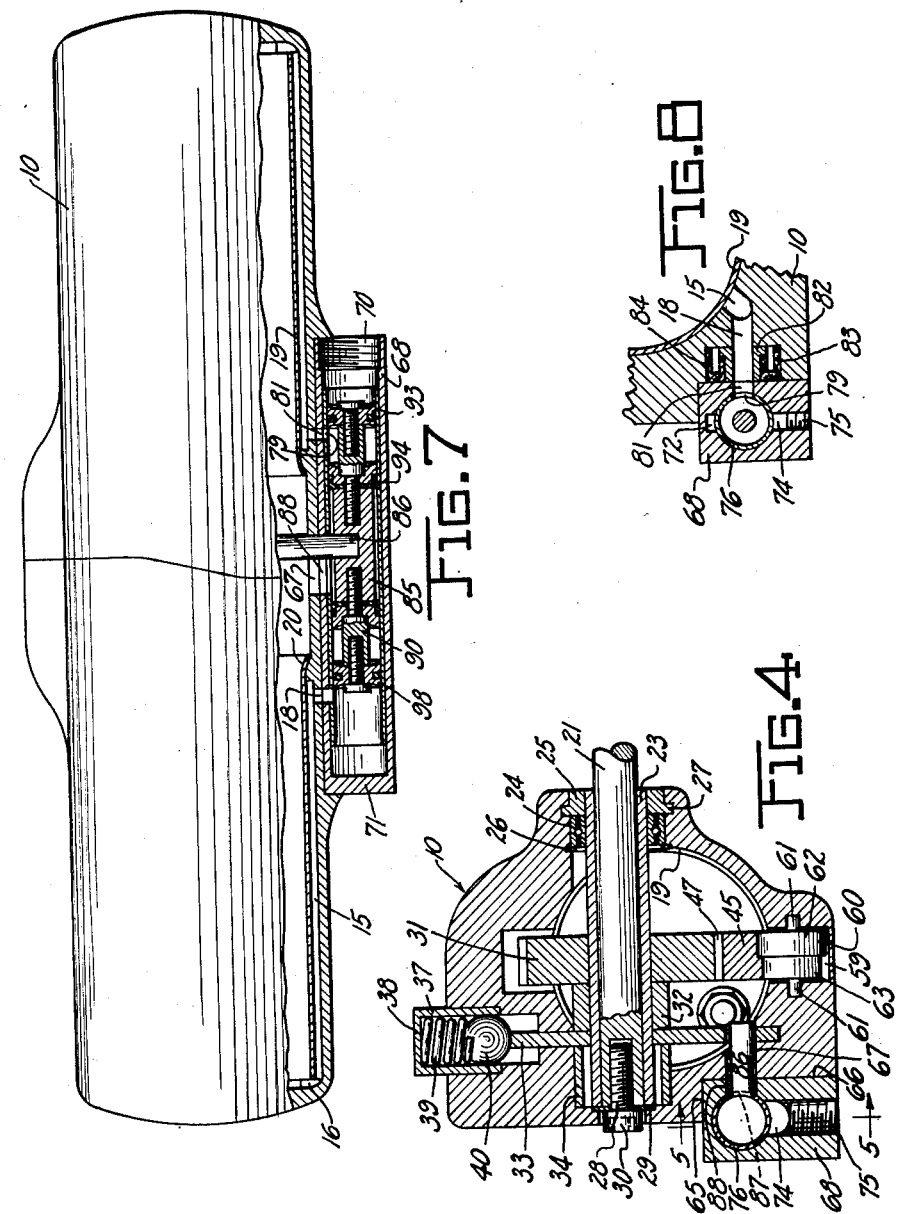
INVENTOR.
FRANK SPRAGUE AND
ELTON F. NICHOLS
BY Ottach + Knoblock
ATTORNEYS Patented May 11, 1954

2,678,029

UNITED STATES PATENT OFFICE 2,678,029

WINDSHIELD WIPER MOTOR

Frank Sprague and Elton F. Nichols, Michigan City, Ind., assignors to Sprague Devices, Inc., Michigan City, Ind., a corporation of Indiana Application October 23, 1948, Serial No. 56,066

10 Claims. (Cl. 121—164)

This invention relates to improvements in windshield wiper motors, and particularly to a motor actuated by fluid under pressure, such as by compressed air.

The objects of this invention are to provide a motor of this type which is of simple, sturdy and inexpensive construction, which is easy to assemble and disassemble, which is provided a novel and simple valve means for controlling the flow of fluid therein, which utilizes a combination and arrangement of parts which will insure trouble-free operation of the motor, which includes means for quickly and easily varying the stroke of the motor, and which includes novel quick-throw means for reversing the direction of operation of the motor as it reaches the opposite ends of its stroke.

Other objects will be apparent from the following specification.

In the drawings:

Fig. 2 is a longitudinal sectional view of the motor taken on line 2—2 of Fig. 3.

Fig. 3 is a longitudinal sectional view of the motor taken on line 3—3 of Fig. 2.

Fig. 4 is a transverse sectional view of the motor taken on line 4—4 of Fig. 2.

Fig. 7 is a view of the motor with the parts shown in section and illustrating the relation of the valve to the motor.

Fig. 8 is a fragmentary transverse sectional view taken on line 8—8 of Fig. 5.

Figure 1:
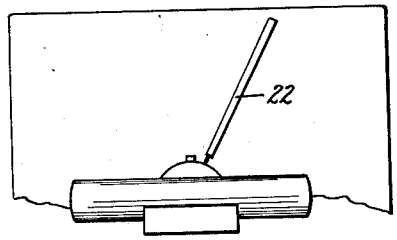
Fig. 1 is a view of the motor in elevation mounting a windshield wiper blade.

Referring to the drawings which illustrate the preferred embodiment of the invention, the numeral 10 designates a motor housing which is preferably formed of two similar substantially cup-shaped parts assembled in axial alignment to define a unit having an elongated bore closed at its ends. Each of the housing parts comprises a cylindrical portion 11, a closed end wall 12, and an enlarged portion 13 at the open end portion thereof. The cup-shaped housing parts are preferably cast or molded and may comprise die castings or other metal castings or may be formed of molded plastic material. The bore of the cylindrical portion 11 of each part is preferably circular in cross-section and of uniform dimension and is enlarged at the mouth portion 13 of each part, providing a circumferential shoulder 14 in the interior of each part between the cylindrical and enlarged portions of the bore. As best illustrated in Fig. 7, the cylindrical bore portion of each part is interrupted by a longitudinal groove 15 which extends from its inner end to a point adjacent to but spaced from the shoulder 14, and the inner end of this groove communicates with a notch 16 formed in a circumferential shoulder 17 formed in the casting. The opposite end of the groove 15 communicates with a transverse outwardly extending aperture 18 which is open at the outer surface of the casting. A pre-formed metal sleeve or tube 19 has a snug fit within the cylindrical bore of each housing part, the same preferably being a press or drive fit, and the inner end of each sleeve bears against the circumferential shoulder 17 of the casting. The opposite end of each sleeve is flared outwardly at 20 to bear against the shoulder 14 of the casting. Any suitable means (not shown) may be provided for securing the mouth portions of the two cup-shaped housing members in registering substantially sealed engagement.

A power take-off shaft 21 adapted to mount a windshield wiper arm and blade 22 is mounted within a sleeve 23, extending transversely of the housing at the longitudinal center thereof and preferably offset laterally relative to the longitudinal axis of the housing, as best shown in Fig. 2. The axes of the shaft 21 and the sleeve 23 preferably lie in the parting plane of the two parts of the housing 10. The housing is provided at one end with an aperture of larger diameter than the sleeve 23 and receives a bearing 24 encircling said sleeve, as illustrated in Fig. 3, and a flanged sleeve 25 against which the outer end of the bearing 24 engages. A split ring 26 encircles the sleeve 23 and preferably seats in a circumferential groove therein to bear against the inner end of the bearing 24. It will be understood that the flange 27 of the sleeve 25 is accommodated and positioned within a receiving groove in the housing by pre-assembling the shaft 21, sleeve 23, bearing 24, sleeve 25 and ring 26 and positioning this assembly between the parts of the housing incident to the assembly of the housing parts. This pre-assembly is accommodated by the provision of the end of the shaft 21, shown at the bottom in Fig. 3, with an axial screw-threaded bore to receive a screw-threaded bolt 28 whose head serves to clamp a disk 29 against the ends of said shaft and sleeve, said housing parts at their mouths being provided with complementary notches which receive the head 30 of the bolt 28 freely therein.

The sleeve 23 fixedly mounts a pinion 31 thereon intermediate its ends. A spacer or collar 32 encircles the sleeve 23 and bears thereagainst at one edge. A quick-throw plate 33 has an opening therein intermediate its ends having a free fit upon the sleeve 23 to accommodate relative rotation of said sleeve and said quick-throw plate. A cylindrical spacer 34 bears against the quick-throw plate at one end thereof and fits within a socket formed in the interior of the housing 10 at its opposite end. The quick-throw plate 33 has a transversely elongated arcuate opening 35 formed in one end thereof, illustrated in Fig. 2 as the lower end, for purposes to be described hereinafter. The opposite end of the plate 33 is provided with a pair of converging angularly disposed surfaces 36 which define a pointed end portion of said plate. The confronting mouths of the two housing portions are provided with semi-circular notches at a point aligned with the plate 33, and cup-shaped member 37 is received in the bore defined by said registering notches. The cup 37 will preferably have an adjustable screw-threaded connection with the housing, and the outer or closed end 38 of the cup 37 is positioned outermost. A coil spring 39 is received within the cup member 37, and a ball 40 is slidable in said cup-shaped member, being normally inwardly urged by the spring 39. The operative relation of the quick-throw parts is best illustrated in Fig. 2, wherein it will be seen that the spring 39 serves to press the ball 40 into engagement with one or the other of the faces 36 of the quick-throw plate 33 and to hold said plate in one of two oppositely tilted positions with respect to the transverse parting plane between the two parts of the housing.

A piston unit is received within and shiftable within the housing 10. This piston unit includes a longitudinal bar 45 located eccentrically in the bore of said housing and mounting at its opposite ends rigid transverse end plates 46 substantially concentric with the bore of the housing. The elongated bar 45 includes a toothed rack portion 47 whose teeth mesh with the teeth of the pinion 31. The central portion 48 of a cup-shaped sealing member bears against the outer surface of each transverse plate portion 46 and is of a size and shape such that its cylindrical marginal portion 49 has a snug fit within one of the sleeves 19. A spacer disk 50 bears against the outer surface of the central portion 48 of each cup-shaped seal, and a positioning disk 51 bears against the outer surface of the spacer 50 and has a curled marginal flange 52 engaging the inner surface of the cylindrical portion 49 of the seal to hold the same in continuous circumferential engagement with the sleeve 19. A clamp plate 53 bears against the outer surface of the member 51. A screw or other securing member 54 extends axially through the piston assembly constituting the parts 46—53 and is anchored in the transverse plate 46, whereby the component parts of each piston are securely held in assembled relation. An elongated screw-threaded rod 55 is carried by and extends between the piston plate portions 46 in offset relation to the bar 45 and parallel to the axis of the housing 10. If desired, this unit may comprise two threaded studs each carried by one of said plates 46 and connected by an internally screw-threaded sleeve 56. The threaded rod 55 is preferably located to pass below the spacer sleeve 32 clear of the quick-throw plate 33 and has mounted thereon a pair of nuts 57 and 58 for adjustment longitudinally of said shaft and substantially equally spaced from and adjacent to the transverse piston plate portions 46. These nuts 57 and 58 may be of any suitable construction and are located on opposite sides of the quick-throw member 33 in all operative positions of the device and are engageable with said quick-throw member in their movement with the piston unit from one to another operative position of said piston unit. The confronting faces of the two housing parts are cut away at a point diametrically opposite the sleeve 37 to define a notch 59 which receives a roller 60 having projecting axial studs 61 which are journaled in the housing. This roller bears against the longitudinal bar 45 at its lower surface at a point opposite the point of engagement with the pinion 31 with the rack 47. In the preferred form of the device, as best illustrated in Fig. 4, the roller 60 is of stepped construction, having a portion 62 of one diameter and a portion 63 of a slightly smaller diameter. The bottom surface of the bar 45 is likewise stepped, as best seen in Fig. 4, so that it engages both of the roller portions 62 and 63 and any tendency of the bar 45 to twist is resisted.

The housing 10 has a longitudinal inset portion or notch in its outer surface defined by the surfaces 65 and 66, as best seen in Fig. 4. The face 66 at the longitudinal center of the casing is interrupted by a longitudinally elongated slot 67 with which a portion of the elongated aperture 35 of the quick-throw plate 33 registers at all times. A pre-formed valve unit having a housing 68 with surfaces adapted to fit in face engagement with the surfaces 65 and 66 of the inset of the motor housing is seated in said inset or notch and is fixedly secured thereto in any suitable manner.

Figure 5:
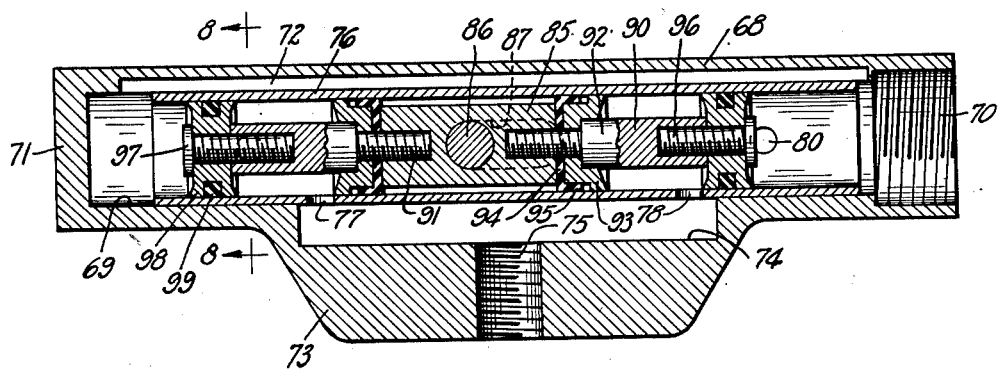
Fig. 5 is an enlarged longitudinal sectional view of the valve element of the motor taken on line 5—5 of Fig. 4 and illustrating the valve in one operative position.
Figure 6:
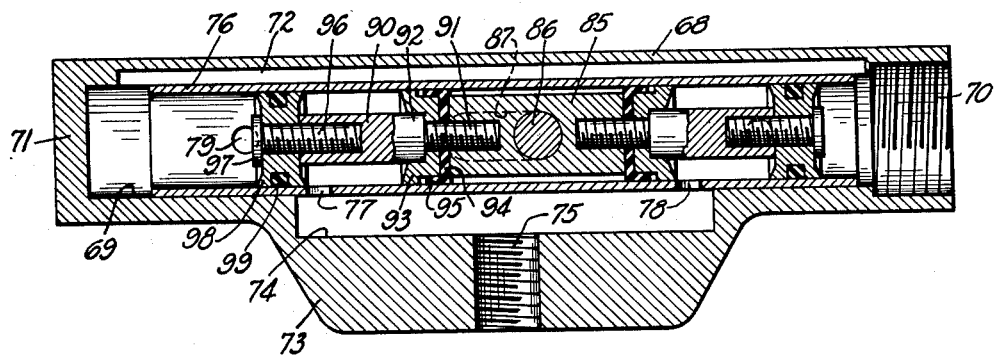
Fig. 6 is a longitudinal sectional view of the valve similar to Fig. 5 but illustrating the same in a second operative position.

The construction of the pre-formed valve contained within the housing 68 is best illustrated in Figs. 5 and 6. The housing 68 has an elongated bore 69 formed therein and open at 70 at one end of said housing. The opposite end of said bore is closed by the housing end wall 71. The valve housing 68 may comprise a metal casting, a die casting or a molded plastic part. The bore 69 is interrupted by a longitudinal groove 72 extending for the major portion of the length thereof but terminating spaced from its opposite ends. The housing 68 also includes a longitudinal offset portion 73, and at this offset portion 73 the bore 69 is interrupted by a second longitudinal groove 74. An intake passage 75, which is preferably screw-threaded, is formed in the projection 73 and communicates with the groove 74 preferably at its center.

A pre-formed metal sleeve 76 of a length shorter than the groove 72 fits snugly within the bore 69 and is preferably located intermediate the length of said groove 72 whereby the opposite ends of said groove 72 are permitted to communicate with the bore 69. The sleeve 76 is provided with a pair of longitudinally spaced apertures 77 and 78 which communicate with the groove 74 adjacent the opposite ends of said groove. In longitudinally spaced relation to these apertures 77 and 78, the sleeve 76 is provided with apertures 79 and 80 preferably projecting radially substantially 90 degrees displaced from the radius along which the apertures 77 and 78 extend. The apertures 79 and 80 register and communicate with lateral bores 81 formed in the valve housing 68, and said valve housing has neck portions 82 projecting therefrom in axial alignment with said bores 81, as best seen in Fig. 8. These necks project into sockets 83 formed in the motor casing 10 open at the face 66 thereof. Annular seals 84 fit in said sockets 83 and encircle the necks 82 to provide a seal preventing leakage between the motor housing 10 and the valve housing 68 at the outlets of said bores 81. The bores 81 communicate with the passages 18.

An elongated rigid member 85 of a cross-sectional size slightly smaller than the inner diameter of the valve sleeve 76 fits within said sleeve, and a stud 86 is mounted thereon and projects radially therefrom through a longitudinal slot 87 formed in the sleeve and registering with a slot 88 formed in the valve body and aligned with the slot 67. Said stud 86 projects through said slots 87, 88 and 67 and into the transversely elongated opening 35 in the quick-throw plate 33.

A stud 90 is mounted upon each end of the member 85 preferably by means of a reduced diameter screw-threaded portion 91 which fits within an axial screw-threaded bore of the member 85. Each stud is provided with a shoulder 92 which engages in a socket of a cup-shaped rigid member 93 whose outer diameter is preferably slightly less than the inner diameter of the sleeve 76 to have a snug or free sliding fit therein. A cup-shaped flexible seal 94 has its central portion clamped between the confronting ends of the members 85 and 93 and has a marginal portion 95 extending toward or in the direction of the member 93 and preferably encircling a portion thereof, said seal portion 95 fitting snugly within and having a continuous circumferential sealed engagement with the inner surface of the sleeve 76. Each stud 90 has an axial screw-threaded bore in its outer end receiving a screw-threaded bolt 96 having an enlarged head 97. An annular member 98 of a diameter having a snug but freely sliding fit within the bore of the sleeve 76 is clamped between the outer end of each stud 90 and the head 97 of the bolt 96 threaded in said stud. Each of the members 98 has a circumferential groove therein which receives an annular resilient sealing member 99, such as an O-ring having a continuous circumferential sealed engagement with the inner surface of the sleeve 76.

In the operation of the device, assuming that the parts of the motor are positioned as illustrated in Fig. 2, the parts of the valve will be positioned as illustrated in Fig. 6. Fluid under pressure, such as compressed air, will be supplied through the valve inlet port 75 by suitable conduit means (not shown) and will pass therefrom into the longitudinal intake passage 74 and through the passages 77 and 78. The sealing member 99 is positioned between the ports 77 and 79 and, consequently, any fluid under pressure entering the sleeve 76 through the port 77 will be confined within the portion of said sleeve between the seals 99 and 95. Fluid which enters the sleeve through the port 78 will pass through said sleeve to the port 80 and thence through the communicating ports 81 and 18 into the longitudinal passage 15 at the right-hand end of the motor. Consequently the fluid under pressure which discharges from the passage 15 through the notch 16 at the outer end thereof into the bore of the motor acts upon the outer surface of the right-hand piston unit shown in Fig. 2. This serves to shift the entire piston unit to the left, as viewed in Fig. 1, and the meshing engagement of the rack 47 with the pinion 33 serves to rotate or oscillate the sleeve 23 and the shaft 21 for the purpose of moving the wiper blade 22. The fluid under pressure which remains within the outer left-hand end of the bore of the motor housing is discharged therefrom through the notch 16, the longitudinal passage 15, to the registering apertures 18 and 81 for discharge through the port 79 of the valve. Fluid so discharged into the sleeve 76 from the port 79 flows longitudinally to the left in Fig. 6 into the bore 69 and the left-hand end of the discharge passage 72 for exhaust through the outlet 70. This setting of the valve and flow of fluid under pressure continues until the right-hand nut 58 upon the rod 55 engages the quick-throw member 33 and shifts the same to a position over center. As soon as the point of quick-throw member 33 passes dead center, the ball 40 pressed by the spring 39 will bear against the surface 36 opposite that which it engages in the Fig. 2 position of said quick-throw member. The spring-pressed ball thus serves quickly to throw the member 33 to a tilted position opposite that shown in Fig. 2. As this quick-throw action occurs the right-hand end of the slot 35 of the member 33 will engage the stud 86 and shift the same in the slots 67, 87 and 88 of the motor housing and the valve housing, thereby shifting the member 85 and the associated shiftable parts of the valve to the position illustrated in Fig. 5. In this position of the valve, the connections of the fluid system are reversed so that delivery of fluid under pressure for motor actuating purposes occurs at the left-hand end of the motor housing, as viewed in Fig. 2, and the right-hand end of said motor housing is connected for the discharge or exhaust of fluid pressure.

The device possesses a number of outstanding advantages. Included among these advantages are the support for the longitudinal connector 45 of the piston unit which is afforded by the roller 60. This insures against any possibility that the teeth of the pinion 47 will slip any of the teeth of the pinion 31 and thereby assures a full stroke of the motor in each direction. Another advantage is that the length of the stroke can be varied at will by a very simple manipulation, namely, a change in the adjustment of the position of each of the nuts 57 and 58 upon the threaded rod 55. Thus where it is required by the physical characteristics of the windshield and the mounting of the windshield wiper motor thereon to have a throw of the wiper blade through a predetermined arc of greater or lesser angular extent than is required by the shape or other characteristic of a different windshield, that difference can be accommodated quickly without requiring any special parts or without requiring a construction specially designed to provide the desired throw. Thus by increasing the spacing of the parts 57 and 58, the angular displacement of the terminal positions of the wiper blade can be increased, and by decreasing the spacing of said nuts 57 and 58 the angular displacement of the terminal positions of the wiper blade can be decreased. Also, it is possible to change the terminal positions of the wiper blade. This can be accomplished by positioning the nuts 57 and 58 at different distances from the piston units adjacent thereto. This adjustability adapts this windshield wiper construction for universal application and makes it possible to meet any mounting problem without any structural change of the device and merely by a simple adjustment thereof.

Another advantage of the device is the construction of the valve with its four seals 95 and 99 which insure against the occurrence of any leakage. Note in this connection that no leakage can occur between either of the ports 77 and 78 and the openings 87, 88 and 67 in which the stud 86 shifts. Therefore no problem of the creation of pressure between the two pistons of the motor can occur, and no problem of leakage of fluid under pressure from the valve can occur.

Other advantages pertaining to the construction of both the valve and the motor housing reside in the cast formation of the housing and the insertion therein of preformed sleeves. This avoids the necessity of difficult and time-consuming honing or finishing operations upon the unit and also simplifies the formation of the various passages extending lengthwise of said unit, such as the passages 15 of the motor housing unit 72 and 74 of the valve unit.

Another feature of considerable advantage and importance in the device is the ability to remove the shaft 21 without completely disassembling the device. Observe in this connection that all that is required to remove said shaft 21 is the release of the bolt 28. Upon the removal of said bolt the shaft 21 can be slid freely from the sleeve. Observe also that there is no danger of a freezing of the shaft within the sleeve and that the simple operation and manipulation of the bolt 28 to back the same out of the receiving bore within the shaft 21 serves to longitudinally shift said shaft within the sleeve 23 in a disengaging or releasing direction by virtue of the abutment of the disk 29 with the housing of the motor.

While the preferred embodiment of the invention has been illustrated and described herein, it will be understood that changes may be made in the construction within the scope of the appended claims without departing from the spirit of the invention.

I claim:

1. In a windshield wiper motor, a housing comprising a pair of similar cup-shaped parts, each having a cylindrical bore in its inner portion and an enlarged interior dimension adjacent its mouth, said cylindrical bore being interrupted by a longitudinal groove extending from its inner end to a point spaced from said enlarged portion and communicating with a lateral aperture, a preformed sleeve fitting snugly in each part with its inner end terminating outwardly of the inner end of said groove, said sleeve and groove cooperating to define a passage open at said aperture and at the inner end of said bore, and means for securing said parts together at their open ends and in axial alignment.

2. The construction defined in claim 1, wherein said housing parts constitute metal castings and said sleeves are preformed and have a press fit in said housing parts.

3. The construction defined in claim 1, wherein said housing parts each has a circumferential interior shoulder between said cylindrical and enlarged bore portions and said sleeves each terminate in a flared end portion bearing against said shoulder.

4. In a windshield wiper motor, a pair of cup-shaped parts each having an inlet aperture and a longitudinal passage communicating with said aperture and open at the inner end of said part, each part having a longitudinal insert in its exterior surface, said apertures opening at said inset surface, means for securing the open end portions of said parts together in register, and a preformed valve unit having a pair of longitudinally spaced outlet ports and of a shape to fit in said insets in face engagement with said parts, and means securing said valve unit to said parts, said valve outlet ports registering with said apertures.

5. In a fluid-pressure-actuated windshield wiper motor, a housing having an elongated bore, a piston unit reciprocable in said bore, said housing having a pair of passages each communicating with said bore at one end thereof and a pair of longitudinally spaced apertures each communicating with a bore; a preformed valve unit secured to said housing, said valve unit comprising a housing having an elongated bore open at one end, an intake port, a longitudinal passage communicating with said intake port and communicating with said bore at its ends, a second longitudinal passage communicating with said bore at its opposite ends, and a pair of longitudinally spaced delivery ports communicating with said bore and registering with said apertures; a valve unit shiftable in said bore and comprising an elongated rigid member mounting two spaced sets of spaced seals, said valve unit having two operative positions, one set of seals establishing communication between an end of said first longitudinal passage and a delivery port, and the other set of seals confining in said bore and therebetween fluid from the other delivery port in each position of said valve unit; and means actuated by said piston unit for shifting said valve unit from one operative position to the other.

6. The construction defined in claim 5, wherein said last named means includes a lost motion member and a spring pressed quick-throw member.

7. The construction defined in claim 5, wherein the portions of said rigid member between said sets of seals are of smaller cross-sectional size than said bore and the portions of said member which mount said seals are of larger cross-sectional size.

8. A valve adapted for use in a fluid pressure actuated windshield wiper, comprising an elongated body having a longitudinal bore open at one end, an intake passage having a pair of outlets communicating with said bore at longitudinally spaced points, a pair of delivery ports spaced longitudinally from each other and from the outlets of said intake passage, and a by-pass communicating with opposite ends of said bore, a valve element, and means for shifting said valve element between two spaced operative positions, said valve element including four longitudinally spaced sealing elements and having portions between the outermost seals and the seals adjacent thereto of smaller cross-sectional size than the cross-sectional size of said bore, one of said outermost seals being positioned between a delivery port and the adjacent outlet of said intake passage and the other outermost seal being positioned clear of the other delivery port and the adjacent outlet of said intake passage in each operative position of said valve element.

9. The construction defined in claim 8, wherein said body has an elongated slot communicating with and extending radially from the central portion of said bore, and an arm carried by said valve element between the inner seals and projecting freely through said slot.

10. In a windshield wiper motor, a housing having an elongated cylindrical bore, a pair of pistons reciprocable in said bore, a rigid member connecting said pistons, a sleeve journaled in said housing and adapted to be rocked by movement of said pistons, said sleeve being open at its opposite ends and at opposite sides of said housing, a shaft detachably mounted in and slidable endwise from said sleeve, means accessible exteriorly of said housing for locking said shaft for conjoint rotation with said sleeve, a quick-throw valve actuator journaled on said sleeve adjacent to said rigid member, and a pair of spaced stops adjustably mounted on said rigid member on opposite sides of and engageable with said actuator to trip the actuator.

References Cited in the file of this patent

UNITED STATES PATENTS

| Number | Name | Date |
| --- | --- | --- |
| 899,999 | Osmer | Sept. 29, 1908 |
| 1,834,607 | Dove | Dec. 1, 1931 |
| 2,224,708 | Van Sittert | Dec. 10, 1940 |
| 2,246,535 | Playfair | June 24, 1941 |
| 2,264,658 | Campbell | Dec. 2, 1941 |
| 2,385,084 | Koppelman | Sept. 18, 1945 |
| 2,415,607 | Sacchini | Feb. 11, 1947 |
| 2,594,856 | Bluhm | Apr. 29, 1952 |